United States Patent [19]

Hasquenoph et al.

[11] 4,129,271
[45] Dec. 12, 1978

[54] AUTOMATIC HANGING AND WEDGING DEVICE FOR AIRCRAFT LOADS

[75] Inventors: Jean H. Hasquenoph, Lagny-sur-Marne; Pierre F. Coutin, Paris, both of France

[73] Assignee: R. Alkan & Cie, Valenton, France

[21] Appl. No.: 787,663

[22] Filed: Apr. 14, 1977

[30] Foreign Application Priority Data

Mar. 9, 1977 [FR] France ................................. 77 06917

[51] Int. Cl.² .............................................. B64D 1/02
[52] U.S. Cl. .............................. 244/137 R; 89/1.5 C; 89/1.5 G; 294/83 R
[58] Field of Search .................. 244/137 R; 89/1.5 R, 89/1.5 B, 1.5 C, 1.5 F, 1.5 G; 294/83 R, 83 AE

[56] References Cited

U.S. PATENT DOCUMENTS

| | | | |
|---|---|---|---|
| 3,056,623 | 10/1962 | Herbert | 244/137 R |
| 3,954,233 | 5/1976 | Hasquenoph et al. | 244/137 R |

*Primary Examiner*—Barry L. Kelmachter
*Attorney, Agent, or Firm*—William Anthony Drucker

[57] ABSTRACT

This device for automatically and releasably hanging and holding loads carried under aircraft against lateral oscillation incorporates a push member and a ball and socket of which the line of action with respect to the load is directed slightly outside the transverse dimension of the associated bridge member engaged by substantially triangular sockets of the ball and socket to prevent any lateral oscillation of the load under centrifugal or transverse aerodynamic or inertia forces.

2 Claims, 3 Drawing Figures

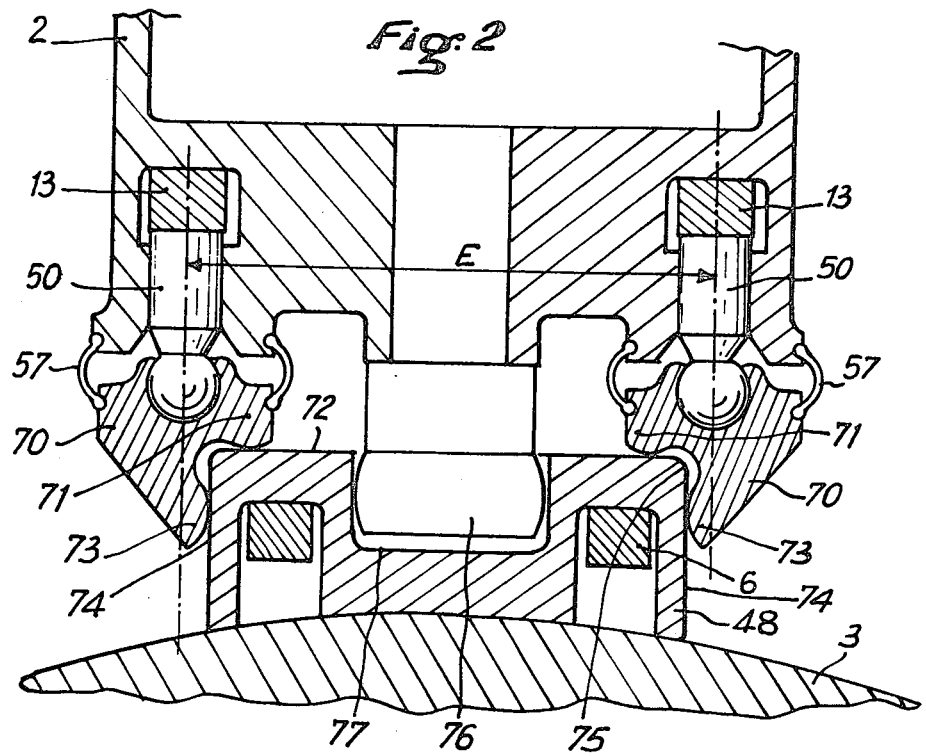

AUTOMATIC HANGING AND WEDGING DEVICE FOR AIRCRAFT LOADS

BACKGROUND OF THE INVENTION

1. FIELD OF THE INVENTION

This invention relates in general to aircraft jettisoning means and has specific reference to improvements in or relating to device for automatically and releasably hanging or suspending and wedging up loads to be carried under aircrafts.

2. DESCRIPTION OF THE PRIOR ART

Prior U.S. Pat. Nos. 3,854,680 and 3,854,681 of Dec. 17, 1974 and 3,954,233 of May 4, 1976 of the same Applicants disclose devices for wedging loads suspended from the understructure of aircraft by means of spring biased wedges. In the U.S. Pat. No. 3,954,233 (FIG. 5) load oscillation about a horizontal longitudinal axis is prevented by ball-and-socket bearings reacting under the control of wedge members against a horizontal plane consisting of the top surface of bridge members rigid with the load, on either side of the median vertical plane of the load. Notwithstanding the considerable friction developed by the bearing pressure exerted by the ball-sockets on the top surface of the bridge members, the load is not positively prevented from slipping transversely on these bearings under the bias of transverse aerodynamic or inertia forces, within the limits allowed by the plays existing in the suspension and centering members.

SUMMARY OF THE INVENTION

It is the essential object of this invention to provide improved arrangements and shapes for said ball-and-socket bearings for the purpose of positively preventing simultaneously any lateral oscillation and any transverse slipping movement of the load.

For this purpose, each ball socket is substantially triangular or V-shaped, with a substantially horizontal arm adapted to engage the top surface of the bridge member and a substantially depending vertical arm adapted to engage a side face of said bridge member, the upper longitudinal edge formed between said top surface and said side face of the bridge member being associated with a corresponding triangular or V-shaped socket.

According to a complementary arrangement characterizing this invention, the distance between centers of the two push-members provided with spherical heads and engaging the corresponding opposite sockets on either side of the median vertical longitudinal plane of said bridge member is slightly longer than the width of said bridge member so that the substantially vertical line of action of said push-members lies somewhat outside the vertical projection of said bridge member.

BRIEF DESCRIPTION OF THE DRAWING

FIG. 2 is a cross section showing the arrangement according to the present invention in the load wedging position thereof, and FIG. 3 is a typical illustration of the possible relative positions of the ball-and-socket bearings and so-called bridge member, before the wedging members become operative.

DESCRIPTION OF THE PREFERRED EMBODIMENT

Figure 1:
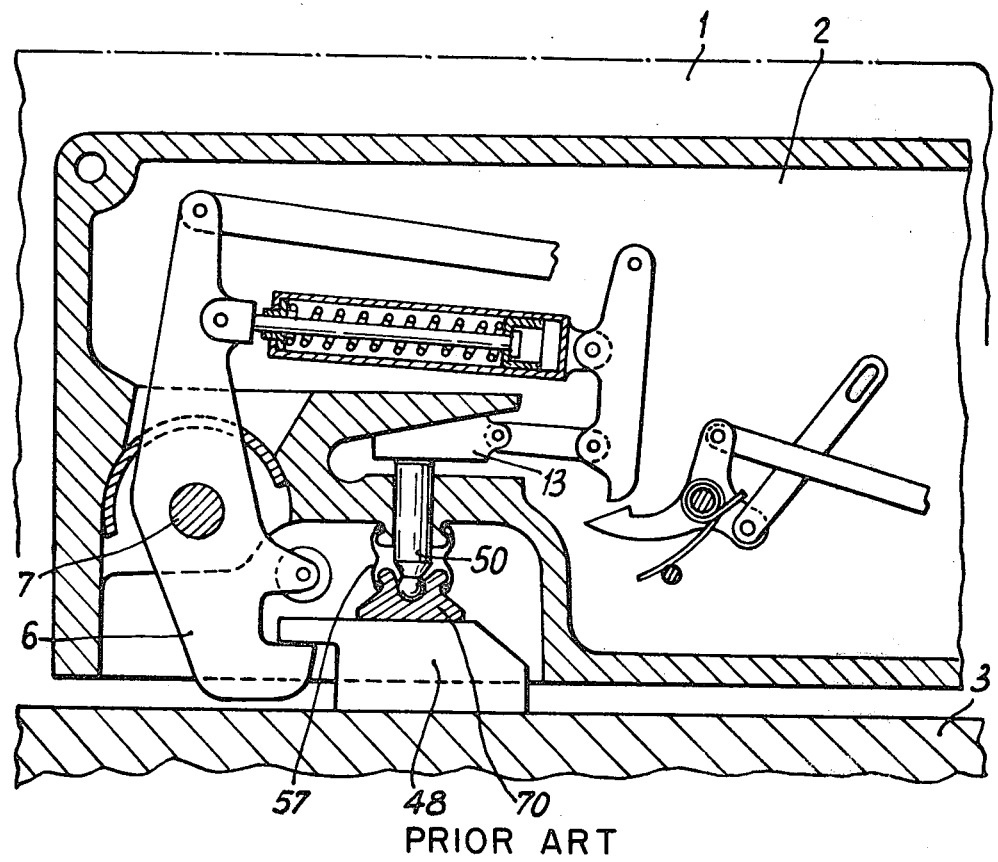
FIG. 1 is a fragmentary longitudinal section of the device, this section being substantially the same as FIG. 5 of the above-mentioned U.S. Pat. No. 3,954,233.

Parts identical with or equivalent to parts already disclosed in said U.S. Pat. No. 3,954,233 are designated herein by the same reference numeral as in said prior U.S. patent to which reference may be made for a more detailed description of the component elements of the device of this invention.

However, it may be reminded briefly that a vertical support 2 interposed between the aircraft structure 1 and the load 3 is advantageously constructed in the form of a casing from which project on the one hand suspension hooks 6 fulcrumed on pins 7 and on the other hand the operative ends of push-members 50 responsive to wedging members 13 associated with control and retaining mechanisms described in detail in said U.S. Pat. No. 3,954,233. Each push member 50 engages a bridge member or saddle 48 rigid with the load 3 through the medium of an associated socket corresponding to socket 53 of the above-mentioned U.S. Pat. No. 3,954,233 but having a particular configuration shown at 70 in the attached drawing. The external portion of push member 50 is provided with an elastic dust cap or sleeve 57 completing the tightness of casing 2 while permitting the relatively limited movement of the relevant sockets 70.

Whereas the sockets 53 of said U.S. Pat. No. 3,954,233 are pieces of revolution, the sockets 70 according to the present invention are substantially triangular or V-shaped with rounded arms, namely a substantially horizontal arm 71 engaging the top surface 72 of bridge member 48 and a substantially vertical depending arm 73 engaging the substantially vertical side face 74 of the same bridge member 48. The transverse distance between centers E measured between the two opposite push members 50 disposed on either side of the median longitudinal vertical plane of the device is increased in this modified structure in order to cause the vertical action of said push members 50 to be exerted slightly outside the vertical side faces 74 of bridge member 48, so that the sockets 70 are caused to engage the registering longitudinal edges 75 of said bridge member 48.

When the push members 50 are in their wedging position they cannot move upwards due to the irreversibility of wedges 13; therefore, any movement of the bridge member 48 and therefore of the load 3 rigid therewith is positively prevented in the transverse direction. To facilitate the approach and hooking up of the load before releasing the wedge members permitting the tightening thereof, centering studs 76 are provided on, and project, from the bottom face of support 2, so that when the load 3 is attached to the device these centering studs 76 engage with a predetermined clearance cylindrical cavities 77 formed in bridge member 48, according to a conventional centering method.

OPERATION

Before releasing the wedges 13 the sockets 70, already constantly biased to their intermediate position by the resilient dust caps 57, are allowed to float slightly FIG. 3 illustrates a random positioning of said socket 70 in relation to bridge member 48. When wedges 13 are released, push members 50 move downwards together with the sockets 70 associated therewith, whereby the socket 70 shown in the left-hand side of FIG. 3 already engaging the top surface 72 of bridge member 48 i pivoted until its vertical arm 73 engages the side face 74 of bridge member 48. Similarly, the socket shown on the right-hand side of FIG. 3, which already engages with its vertical arm 73 the registering side face 74 of bridge member 48, is lowered until it engages with its horizontal arm 71 the top surface 72 of bridge member.

Since the action of wedges 13 is constantly preserved, any play tending to develop is taken up immediately.

What we claim is:

1. In a device, for suspending a load from an aircraft having a support to be secured to the aircraft, a bridge member to be secured to the load, said bridge member having an abutment at an end thereof and an upper face and two opposed side faces, and a suspension hook pivotably mounted on the support and movable into a first position in which said hook is disengaged from the abutment of the bridge member, and a second position in which said hook is engaged under the abutment of the bridge member for suspension of the load from the support, the improvement for preventing lateral oscillation of the load when suspended from the support, said improvement comprising:

(i) first and second push members each having a first end and a second end, said push members being longitudinally slidable in said support towards and away from the upper face of the bridge member, (ii) first and second sockets, the first socket being engaged by a ball and socket formation with a first end of the first push member, the second socket being engaged by a ball and socket formation with a first end of the second push member, each socket including a first arm portion depending below the center of the ball and socket formation and a second arm extending laterally from said center towards the other push member, the push members and the sockets being positioned in relation to the bridge member such that, upon movement of each push member towards the upper face of the bridge member the second arm of each socket contacts said upper face and, with continued movement of the push member in that direction, causes pivoting of the socket about said center to move the first arm of the socket into abutment with the respective adjacent side face of the bridge member, (iii) wedging means movable in said support and contacting the second end of each push member for shifting each push member in the direction towards the upper face of the bridge member.

2. A device, as claimed in claim 1, wherein the center of the ball and socket formation of the first push member is spaced from the center of the ball and socket formation of the seond push member by a distance greater than the spacing of the side faces of the bridge member from each other.

* * * * *